United States Patent Office 2,882,751
Patented Apr. 21, 1959

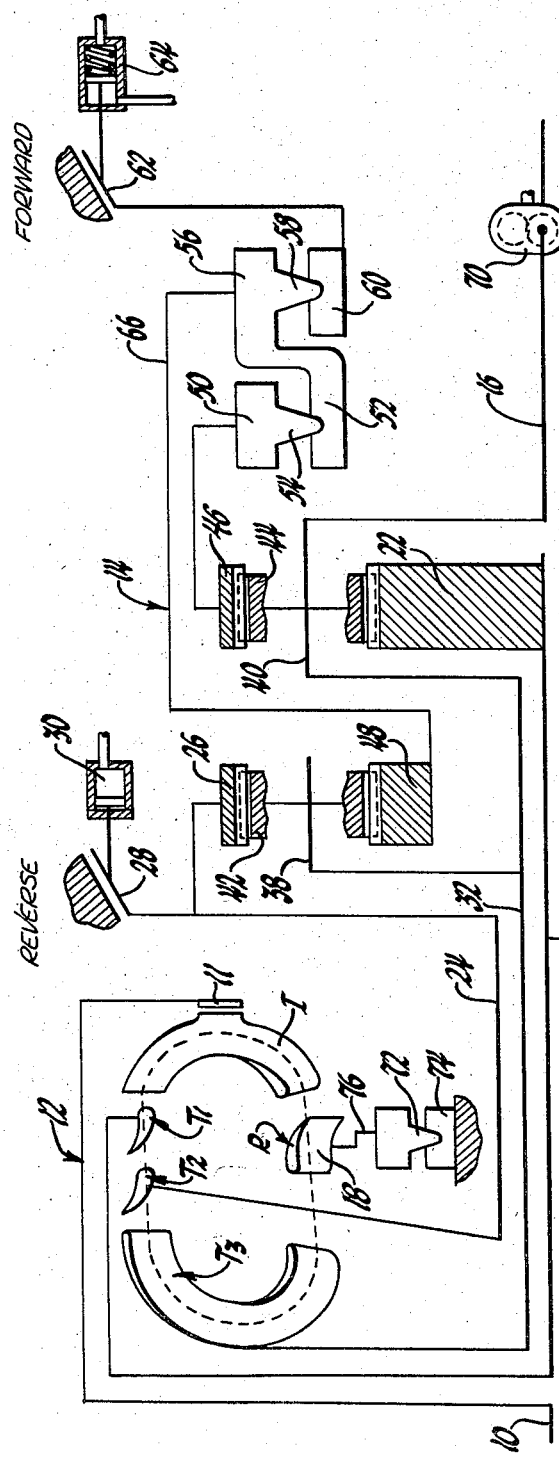

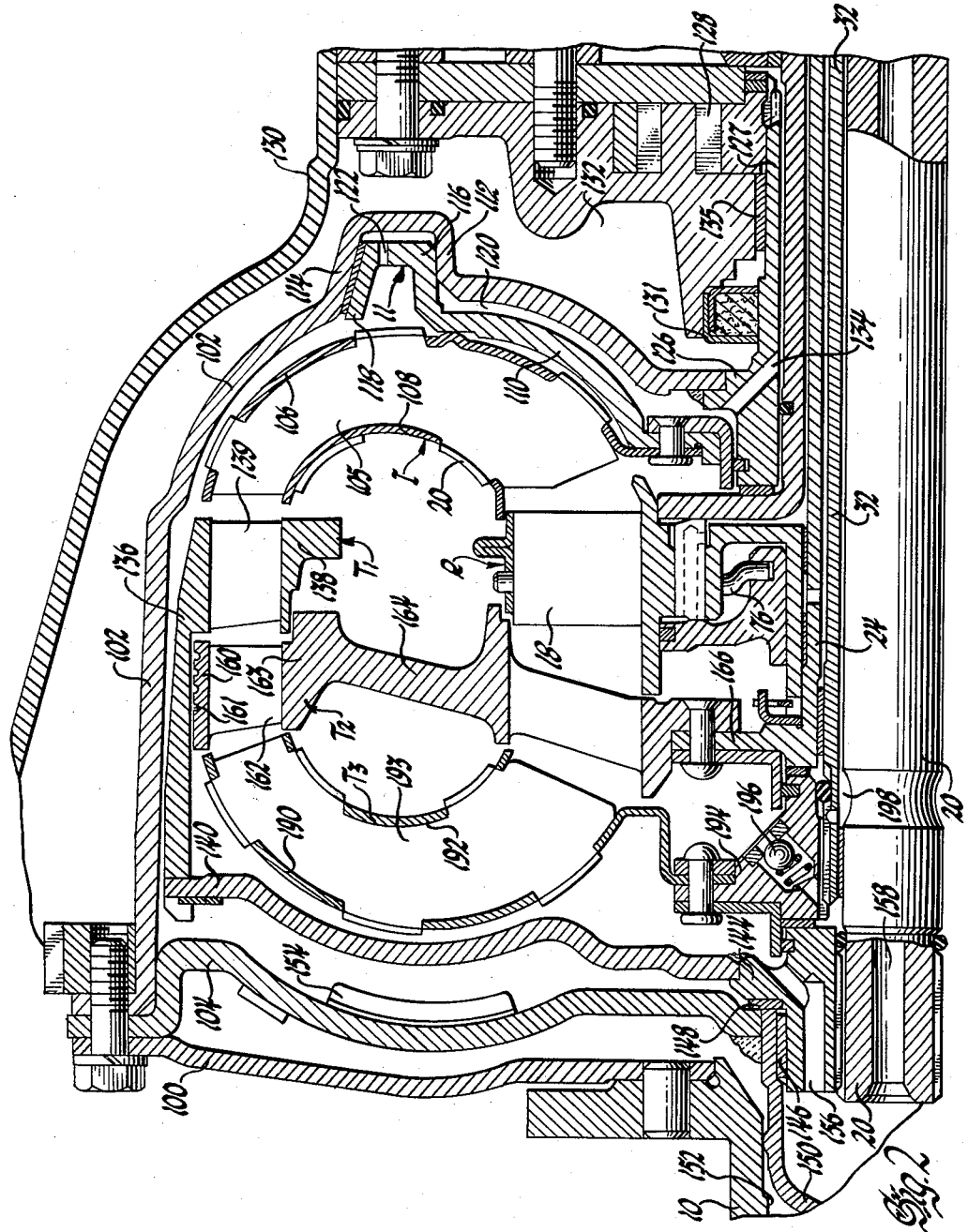

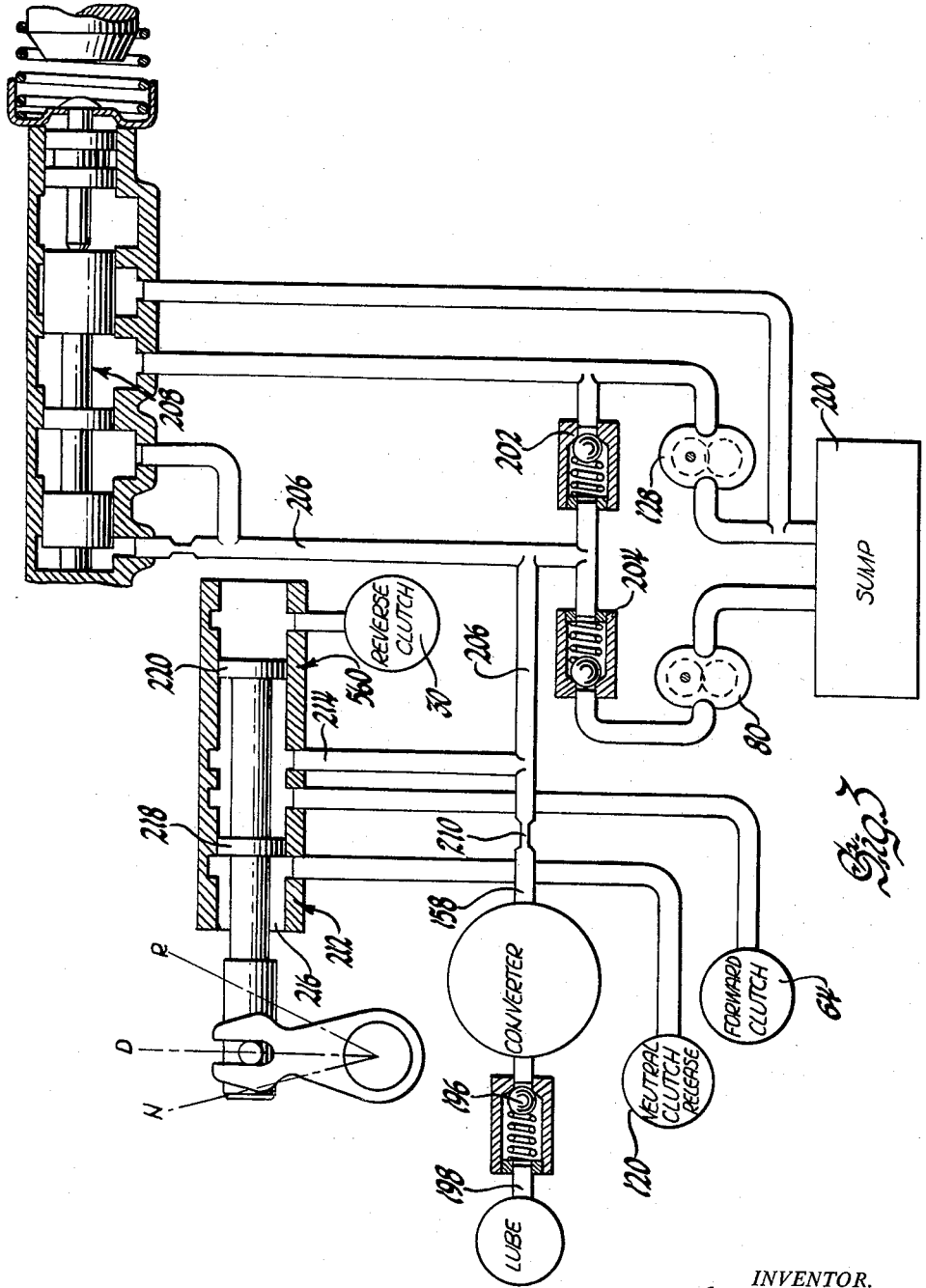

2,882,751

TRANSMISSION

Oliver K. Kelley, Bloomfield Hills, Mich., assignor to General Motors Corporation, Detroit, Mich., a corporation of Delaware Original application July 17, 1956, Serial No. 598,370. Divided and this application July 31, 1957, Serial No. 675,376

13 Claims. (Cl. 74—677)

This application is a division of my application, Serial No. 598,370, filed July 17, 1956. That application discloses improvements in hydrodynamic torque transfer and/or multiplying devices and associated gearing for driving a power output member at various speed ratios from a power input member, particularly suited to motor vehicle transmissions.

This divisional application relates to a neutral clutch for that transmission and to apparatus for controlling the neutral clutch and other elements of the transmission. It is among the objects of this invention to provide an improved clutch within a hydrodynamic torque transmitting device for connecting or disconnecting the impeller and the engine, and to provide improved control mechanism for it.

More particularly it is an object to provide such a clutch which is normally engaged by inherent forces in the transmission, but which can be disconnected at will or in response to the establishment of a neutral state in the control system.

These and other objects and advantages of the invention will be apparent in the following description and in the accompanying drawings, in which:

Figure 1 shows schematically a transmission embodying one form of my invention, being one-half of a longitudinal section which is symmetrical about the axis of rotation, Figure 2 is one-half of a symmetrical longitudinal section of the actual structure of a torque converter embodying one form of my invention, and Fig. 3 is a diagram of a hydraulic control system for a transmission shown in the preceding figures.

General arrangement

Referring to Fig. 1, the transmission includes in general an input or engine shaft 10 which can be connected by a neutral clutch 11 for driving a hydrodynamic torque transfer device, exemplified as a torque converter 12 which in turn drives planetary reduction gearing 14 connected to a final drive shaft 16. The torque converter includes a pump or impeller I, of generally known form, rotated by the input shaft 10 when connected by the neutral clutch 11 and circulating working liquid in a closed toroidal path which includes a series of turbines, preferably three, and a reaction member, stator or guide wheel. The first turbine $T_1$, the second turbine $T_2$, which receives oil from the first turbine $T_1$, and a third turbine $T_3$, which receives oil from the turbine $T_2$ and returns oil to the pump I, constitute the power output elements of the torque converter, and these are the driving or input elements for the planetary gearing. The reaction member, indicated R, is represented by the single reaction blade 18.

The first turbine $T_1$ is connected by a central shaft 20 to a rear input sun gear 22 of the planetary gearing. The second turbine $T_2$ is connected through a hollow shaft 24 surrounding the shaft 22 to a front input ring gear 26 which can be held fast by a device 28 operated by a fluid pressure actuator 30. The turbine $T_3$ is connected through a hollow shaft 32 also surrounding the central shaft 20 to drive the front carrier 38 and the rear carrier 40 of the planetary gearing, which carriers are connected together and respectively support front planetary pinions 42 meshing with the front input ring gear 26 and rear planetary pinions 44 meshing with the rear input sun gear 22. The shaft 32 and the carriers 38 and 40 form the principal drive shaft of the transmission and are connected to the transmission output shaft 16. A forward drive reaction ring gear 46 meshing with planets 44 completes the rear planetary unit of the reduction gear, and a reaction sun gear 48 meshing with the front planetary pinions 42 completes the front planetary unit.

The rear reaction ring gear 46 may be held fast to establish forward drive from the first turbine $T_1$ through the planetary reduction gear 22—44—46. To this end the gear 46 is connected to the outer race 50 of a front one-way torque-establishing device such as a clutch, free wheeler or ratchet device having any suitable one-way or ratchet torque-transmitting members mounted on an intermediate hub 52 which forms the inner race of the front clutch. This is schematically represented by the blade 54 fixed to the outer race 50 and overlapping the inner race 52 which indicates that the race 50 can turn forward toward the eye of the observer and away from the race 52 but cannot turn in the opposite direction. This represents any suitable one-way clutch. The intermediate hub 52 is connected to an outer race 56 for a rear one-way clutch represented by the blade 58 fixed to the race 56 and overlapping an inner race 60 which can be held against rotation by a device 62 which can be set by a hydraulic operator 64 to provide forward drive whenever the neutral clutch 11 is engaged. The intermediate races 52 and 56 are connected to the front reaction sun gear 48 by a drum 66. The arrangement of the one-way clutches is such that when the forward device 62 is set, the race 56 and the reaction sun gear 48 are prevented from turning backward, and the hub 52 prevents the race 50 and the reaction gear 46 from turning backward. In one condition of operation, as will be explained, the ring gear 46 turns forward while the reaction sun gear 48 is held stationary, and under another condition both the ring gear 46 and the sun gear 48 rotate forward. In reverse drive sun gear 48 is positively driven backward by the ring gear 46 through the one-way clutch 50—54—52, forward clutch 62 being released, as will be explained.

An oil pump 70 may be driven by the output shaft 16.

Heretofore the various usages of the terms clutch and brake have caused confusion. Some uses of the terms have been based on use or function of the device regardless of structure while other uses of the terms have been based on type of structure or arrangement regardless of use or function. This has sometimes led to definitions of clutch and brake being mutually exclusive where they should not be and has led to overlapping definitions where mutual exclusion was intended. None of these definitions which have come to my attention have satisfactorily taken care of the situation in which an identical specimen is sometimes a brake and sometimes a clutch. Neither do they adequately describe a situation in which it is immaterial whether a member is a brake or a clutch, as described by reference to structure, where the significant consideration is the function of the device regardless of its structure.

To avoid this confusion and indefiniteness, the term torque-establishing device is used herein generically to mean any disengageable device which can be engaged to prevent relative rotation between two members which are otherwise relatively rotatable. If both members are rotatable absolutely, the device when engaged forces them to rotate at the same speed so that one member can drive the other. In this case the device may be defined more specifically as a drive clutch. On the other hand, if one of the members is fixed, then engagement of the device holds the other member fast, in which case the generic device may be specifically defined as one form of brake or lock. Where the device prevents relative rotation between two members in one sense of rotation but permits relative rotation in the opposite sense, then it is called a one-way ratchet device or freewheeler which terms are used to mean any device between two relatively rotatable members which permits the first member to rotate in one sense with respect to the second member but prevents the first member from rotating in the opposite sense with respect to the second member; that is, it locks or clutches the two members together.

These definitions are adopted in view of the custom of engineers of referring to a clutch as anything which engages to establish drive or change ratios in a transmission, and referring to a brake as something which retards the vehicle.

*Operation of general arrangement*

For forward driving, the forward device 62 is set, the neutral device 11 is engaged, and all other torque-establishing devices are released. On starting, the inertia of the car holds carriers 38, 40 and the turbine $T_3$ stationary. Oil from the pump I, rotated at suitable speed, exerts torque on $T_1$ to drive the rear input sun gear 22 forward, which because the reaction gear 46 is held by forward device 62 and the two one-way devices 60—58—56 and 52—54—50, drives the output shaft 16 forward at reduced speed; multiplying the torque supplied by turbine $T_1$ by the ratio of the gearset 22—44—46. This necessarily also positively drives the turbine $T_3$ forward regardless of hydraulic conditions in the torque converter because $T_3$ is positively connected to the output shaft 16. In addition, oil flowing from $T_1$ to $T_2$ exerts torque on $T_2$, which through shaft 24 drives the front input ring gear 26 forward, tending to rotate the front pinions 42 forward. When ring gear 26 rotates fast enough this tends to rotate the front reaction sun gear 48 backward, but this is prevented by the rear one-way device 50—38—56 and, in fact, the front sun gear 48 has previously been locked by the rear reaction gear 46 and the two one-way devices as described. Consequently, the front ring gear 26 adds to the drive of the torque of $T_2$ multiplied by the ratio of the front planetary gear set 26—42—48.

On starting the car and below some definite speed, depending upon the design of the blades of the torque converter, the turbine $T_3$ may not exert any significant positive or forward torque derived from hydraulic action but is positively driven by the carriers. However, at some definite speed ratio of input shaft to output shaft, positive hydraulic torque is impressed on $T_3$ and its speed, due to hydraulic action, tends to exceed the speed of the carriers as driven by the other turbines. At this point $T_3$ assists in driving the car by torque exerted on the main drive shaft 20—40—16.

As the speed of the car progressively increases from standstill two things happen successively. First, the torque delivered to the output shaft by $T_1$ through the rear planetary units drops to a vanishing point as $T_1$ reaches its terminal speed. Meanwhile the speed of $T_2$ increases. When the speed of $T_2$ multiplied by the ratio of the front planetary unit, exceeds the speed of $T_1$ multiplied by the ratio of the rear planetary gearing, $T_2$ is driving the carriers faster than $T_1$ can drive them and the front freewheeler 52—54—50 breaks away. Then the rear reaction gear 46 rotates forward and $T_1$ idles in the oil stream. $T_2$ is now driving the car and may be assisted by $T_3$. Second, upon further increase in the speed of the car, $T_2$ reaches its terminal speed and can no longer drive the carriers 38—40 through the front planetary gears as fast as $T_3$ can drive them, $T_3$ being directly connected to the carriers. $T_3$ alone then drives the carriers, the rear freewheeler 60—58—56 breaking away and the sun gear 48 turning forward while $T_2$ idles in the stream of oil.

For reverse drive, the neutral device 11 is engaged, the forward device 62 is released, and the reverse device 28 is set to hold the front ring gear 26 as a reaction gear. Incidentally, this holds $T_2$ stationary during all reverse drive. Now, $T_1$ drives the rear input sun gear 22 forward which, because carrier 40 is initially held stationary by the car, drives the ring gear 46 backward and, through the front one-way device 50—54—52, drives the front sun gear 48 backward. This is permitted, in fact, for although the rear one-way device 60—58—56 tends to lock its inner race 60 can turn backward being unopposed by the released forward device 62. Consequently, the front sun gear 48 rotating backward drives the carrier 38 slowly backward, carrying the turbine blade $T_3$ positively backward. In fact, it is possible depending on blade design, for the turbine $T_3$ to have reverse torque impressed on it hydraulically in which case it will assist in driving the car backward. The turbine $T_2$, being held stationary in reverse drive, acts as a guide wheel or reaction member directing oil from $T_1$ backward against the forwardly facing sides of the blades of $T_3$, causing them to drive the carriers backward.

The stator is mounted on any suitable support having any known one-way device represented by the blade 72 and supported on a stationary tube 74 so as to permit forward rotation but prevent backward rotation in the well-known manner. In order to provide different ranges of torque multiplication for different driving conditions, the angular positions of the blades 25 of the reaction member may be changed. For this purpose each reaction blade 18 is fixed to a rotatable crank arm 76. Suitable operators position the cranks to hold the blades at the desired angles.

*Structural arrangement*

Fig. 2 illustrates one form of actual structure of torque converter embodying the invention and including elements and their method of operation disclosed schematically above. The blade arrangements of the various elements of the torque converter have previously been proposed by me. The engine shaft 10 is bolted to a flywheel 100 which is bolted to a torque converter casing including an outer shell 102 and a front cover 104. The impeller blades 105 are attached to an outer impeller shell 106 and to an inner shroud 108. The space between the shell and the shroud forms the path through the impeller for working liquid, as is known. At its center edge, the impeller shell 106 is riveted to a quarter-toroidal shell 110 which is formed at its outer edge into one member of neutral device 11, the other member of which is formed in the shell 102. When the device 11 is engaged, by controls to be explained, the impeller is driven by the engine. The impeller member of the device 11 includes a cylindrical surface 112 and a frusto-conical surface 114 which mate respectively with a cylindrical surface 116 and a frusto-conical surface 118, both formed in the drum 102. The space 120 between the torque converter shell 102 and the device shell 110 constitutes an expansible chamber motor, hydraulic cell, or servo by which the device may be held disengaged, the device being engaged by pressure of oil in the converter on the shell 110 when this servo 120 is vented, as will be explained.

The cylindrical surfaces 112 and 116 form a seal which effectively prevents leakage from the servo 120 when the latter is filled. The conical surfaces 114 and 118 form the torque-transmitting elements. If it is necessary to allow oil to escape from the pocket in the device when the device is being engaged, openings 122 may be provided or the engaging surfaces may be grooved.

The converter shell 102 is welded to a hub 126, secured to or forming part of a tubular shaft 127 which drives any suitable oil pump 128 (herein called the front pump) enclosed in part of the stationary casing 130. The shaft 127 is surrounded by a seal 131 which prevents leakage of oil from the torque converter into the dry chamber 132 which encloses the torque converter and is in turn enclosed within the transmission casing 130. The hub 126 is drilled and is spaced from the stator supporting sleeve 86 to form a passage 134 by which oil may be supplied to the release servo 120, as will be explained. The shaft 127 may be supported in the casing by a radial bearing 135.

The first tubine $T_1$ includes an outer supporting shell 136 and an inner shroud 138 between which the blades 139 are fixed. The $T_1$ shell 136 is suitably keyed to a $T_1$ flange 140. The $T_1$ flange 140 is welded at its center to hub 144 keyed to the innermost shaft 20 which drives the rear sun gear 22 shown in Fig. 1. The hub 144 supports the front end of the shaft 20 and is itself supported for rotation by a radial bearing 146 and a thrust bearing 148 both bearing against a cap 150 which is secured to the front cover 104, as by welding. The cap 150 is supported slidably in a bore 152 in the engine shaft 10 and completes the closed chamber of the torque converter formed by the rear seal 131, shell 102 and front cover 104. The front cover 104 carries on its inner face a number of radial vanes 154 which rotate the liquid in the space between the cover 104 and the first turbine flange 140 at the same speed that the liquid is rotating within the working space of the torque converter and thus creates outside of the first turbine flange 140 static centrifugal pressure which balances that within the torque converter. The hub 144 has openings 156 for supplying oil to the torque converter from a passage 158 in the shaft 20, to which the system supplies oil under pressure.

The second turbine $T_2$ includes an outer shell 160 having grooves 161 which forms a labyrinth seal with the drum or shell 136 of the first turbine $T_1$. The blades 162 are supported between this outer shell 160 and an inner shroud 163 which is fixed to or forms part of a spider 164 is riveted to a flange 166 or hub secured to the front end of the shaft 24, the other end of which drives the ring gear 26 of Fig. 1.

The third turbine $T_3$ includes an outer shell 190 and an inner shroud 192 between which the blades 193 are fixed. The outer shell 190 is riveted to a hub or flange 194 keyed to the front end of the hollow main shaft 32 connected at its rear end to the carriers 38 and 40 of both planetary gear units and to the transmission output shaft or car propeller shaft 16. A pressure relief valve 196 discharges oil from the converter to a return passage 198 between shafts 20 and 32.

In general the objects of the invention as embodied in the control system are to provide two sources of control pressure, one operative whenever the engine is running, and one operative whenever the car is running forward; and a manually operable selector for selecting forward, neutral and reverse and means for supplying pressure fluid to the neutral clutch release chamber whenever the control is set for neutral and venting the release chamber at other times.

The source of pressure operative whenever the engine is running is the front pump 128 shown in Figs. 2 and 3. This may be of the internal-external gear type and is designed to pump oil at a constant displacement. The source of pressure operative when the car is running forward is the rear pump 70 as shown in Figs. 1 and 3, which may be similar in construction and operation to the front pump.

Referring to Fig. 3 both pumps take in oil from a common sump 200 and their outlets discharge through check valves 202 and 204 to a main line 206 in which the pressure may be maintained constant (e.g. 80 pounds) by any known pressure regulator valve 208.

Oil is supplied to the converter from the main line 206 through conduit 158 previously referred to which includes the bore 158 of the hollow shaft 20 in Fig. 2. Oil is supplied to the converter through a restriction 210 and oil is led from the converter to lubricate the various parts of the apparatus by the conduit 198 under the control of the pressure-responsive release valve 196. This arrangement maintains a static pressure in the torque converter which is below that of the main line and may be for example 30 pounds per square inch.

A manual selector valve 212 is supplied with oil from the main line 206 at its inlet port 214. The valve is shown in the forward drive position in which oil is supplied to the forward clutch apply cylinder 64. At the same time the neutral clutch release servo 120 is vented through the open end 216 of the manual valve. This permits the pressure of oil in the converter to apply the neutral clutch and the forward clutch 62 sustains the necessary torque reaction in the planetary gearing to drive the car.

Whenever the manual valve 212 is in neutral position, designated N, the open end 216 of the shift valve is closed by land 218 to supply the release chamber 120 of neutral clutch 11 with oil from main line port 214 to hold the neutral clutch disengaged. In both other positions of the manual valve the land 218 is at the right of the connection to chamber 120 to vent it through the open end 216 to permit converter pressure to engage the neutral clutch 11.

In the forward drive positions the land 220 is between the connections to neutral clutch release chamber 120 and forward drive clutch servo 64 so that the forward drive clutch (62) in Figure 1 is engaged. Whenever the manual valve is placed in reverse or R position the land 220 moves to the right of the connection to the reverse clutch servo 30, and land 218 takes the position between the mainline port 214 and the connection to the drive clutch servo 64. This vents the forward drive clutch servo 64 and the neutral clutch release servo through the open end 216 and supplies oil to the reverse clutch servo 30.

Assume the car is standing still with the engine running and the throttle closed or in the idling position. If the manual valve is in neutral position, the neutral clutch release servo 120 is supplied with oil and consequently disengages the neutral clutch 11. Also the forward drive clutch servo 64 is energized, setting the forward drive clutch 62. This arrangement assures that when the control is later put into drive the forward drive clutch will always be set before the neutral clutch is engaged.

Let us assume that the car is now started by placing the manual control in either D or R position. With the control in either, the neutral clutch release chamber 120 is vented and the neutral clutch is applied, thus conditioning the car for drive. Thereafter opening of the throttle starts the car in the usual manner.

I claim:

1. In a transmission, a hydrodynamic torque transmitting device comprising in combination, a rotatable closed container for liquid, bladed impeller and turbine members in the container which members are rotatable with respect to each other and to the container, the transmission including means responsive to rotation of the container for continuously maintaining pressure in the container, means continuously responsive to said pressure in the container for yieldingly connecting the impeller to the container, and means for overcoming the pressure of the container on the connecting means to prevent operation of the connecting means.

2. In a transmission, a hydrodynamic torque transmitting device comprising in combination, a rotatable closed container for liquid, bladed impeller and turbine members in the container which members are rotatable with respect to each other and to the container, the transmission including means responsive to rotation of the container for continuously maintaining pressure in the container, means continuously responsive to said pressure in the container for yieldingly connecting the impeller to the container, and fluid pressure operated means for overcoming the pressure of the container on the connecting means to prevent operation of the connecting means.

3. In a transmission, a hydrodynamic torque transmitting device comprising in combination, a rotatable closed container for liquid, bladed impeller and turbine members in the container which members are rotatable with respect to each other and to the container, the transmission including means responsive to rotation of the container for continuously maintaining pressure in the container, means continuously responsive to the said pressure in the container for yieldingly connecting the impeller to the container, and means operable outside the container for overcoming the pressure of the container on the connecting means to prevent operation of the connecting means.

4. In a transmission, a hydrodynamic torque transmitting device comprising in combination, a rotatable closed container for liquid, bladed impeller and turbine members in the container which members are rotatable with respect to each other and to the container, the transmission including means responsive to rotation of the container for continuously urging the impeller into torque transmitting relation with the container, and means for preventing operation of the urging means.

5. A hydrodynamic torque transmitting device comprising in combination, a rotatable closed container for liquid, bladed impeller and turbine members in the container which members are rotatable with respect to each other and to the container, the impeller being movable toward and away from a wall of the container, the transmission including means for maintaining pressure in the container, a friction clutch element on the impeller, a friction clutch element on the wall of the container, means responsive to the pressure in the container urging the impeller toward the wall of the container to engage the clutch elements, and fluid pressure operated means for opposing the urging means and disengaging the clutch elements.

6. In a transmission, a hydrodynamic torque transmitting device comprising in combination, a rotatable closed container for liquid, bladed impeller and turbine members in the container which members are rotatable with respect to each other and to the container, the transmission including means responsive to rotation of the container for continuously maintaining pressure in the container, means continuously responsive to said pressure in the container for yieldingly connecting the impeller to the container, fluid pressure operated means for overcoming the pressure of the container on the connecting means to prevent operation of the connecting means; the transmission including means for selectively conditioning the transmission for forward drive, for neutral, and for reverse drive; means responsive to conditioning for either forward or reverse drive for venting the pressure operated means, and means responsive to neutral conditioning for supplying fluid under pressure to the last-mentioned pressure-operated means.

7. A hydrodynamic torque transmitting device comprising in combination, a rotatable closed container, bladed impeller and turbine members in the container, said members being rotatable with respect to the container and to each other, means for urging the impeller toward a wall of the container to prevent relative rotation between the impeller and container, an expansible fluid pressure chamber within the container adapted to hold the impeller away from the wall of the container against said urging means, a stationary support for the rotatable container and means in the support for supplying fluid under pressure to the expansible chamber.

8. A hydrodynamic torque transmitting device comprising in combination, a rotatable closed container, rotatable bladed impeller and turbine members in the container, means for maintaining the container filled with liquid under pressure, the impeller having a wall conforming to a wall of the container and forming with the wall of the container a closed chamber separate from the liquid in the container, the impeller being urged against the wall of the container under influence of pressure within the container to prevent relative rotation of the impeller and container, means for supplying fluid under pressure to said chamber to prevent driving connection between the container and the impeller while maintaining non-driving contact between the impeller and container to seal said chamber.

9. A transmission comprising in combination, a hydrodynamic torque transmitting device including a closed container for liquid, the container being rotatable about an axis and having a wall formed as a surface of revolution, impeller and turbine members in the container which members are rotatable with respect to each other and to the container, the impeller being axially movable toward and away from said wall and having a wall formed as a surface of revolution conforming to the wall of the container, said surfaces of revolution including cylindrical surfaces on the impeller wall in sealing contact with cylindrical surfaces on the container wall to define an expansible pressure chamber separate from the container, clutch surfaces on the container wall and on the impeller wall adapted to be engaged to establish driving connection between the walls, means for supplying fluid under pressure to the container to urge the walls toward each other to engage the clutch surfaces, and means for selectively venting the chamber and filling it with fluid under pressure to permit or prevent engagement of the clutch surfaces.

10. A transmission comprising in combination, a hydrodynamic torque transmitting device including a closed container for liquid, the container being rotatable about an axis and having a wall, impeller and turbine members in the container which members are rotatable with respect to each other and to the container, the impeller being axially movable toward and away from said wall and having a wall conforming to the wall of the container, said walls including cylindrical surfaces on the impeller wall in sealing contact with cylindrical surfaces on the container wall to define an expansible pressure chamber separate from the container, clutch surfaces on the container wall and on the impeller wall adapted to be engaged to establish driving connection between the walls, means for supplying fluid under pressure to the container to urge the walls toward each other to engage the clutch surfaces, and means for selectively venting the chamber and filling it with fluid under pressure to permit or prevent engagement of the clutch surfaces.

11. A transmission comprising in combination, a hydrodynamic torque transmitting device including a closed container for liquid, the container being rotatable about an axis and having a wall formed as a surface of revolution, impeller and turbine members in the container which members are rotatable with respect to each other and to the container, the impeller being axially movable toward and away from said wall and having a wall formed as a surface of revolution conforming to the wall of the container, said surfaces of revolution including cylindrical surfaces on the impeller wall in sealing contact with cylindrical surfaces on the container wall to define an expansible pressure chamber separate from the container, said surfaces of revolution including frusto-conical clutch surfaces on the container wall and on the impeller wall adapted to be engaged to establish driving connection between the walls, means for supplying fluid under pressure to the container to urge the walls toward each other to engage the clutch surfaces, and means for selectively venting the chamber and filling it with fluid under pressure to permit or prevent engagement of the clutch surfaces.

12. A transmission comprising in combination, a hydrodynamic torque transmitting device including a closed container for liquid, the container being rotatable about an axis and having a wall formed as a surface of revolution, impeller and turbine members in the container which members are rotatable with respect to each other and to the container, the impeller being axially movable toward and away from said wall and having a wall formed as a surface of revolution conforming to the wall of the container, said surfaces of revolution including cylindrical surfaces on the impeller wall in sealing contact with cylindrical surfaces on the container wall to define an expansible pressure chamber separate from the container, said surfaces of revolution including frusto-conical clutch surfaces disposed radially outside the cylindrical surfaces on the container wall and on the impeller wall adapted to be engaged to establish driving connection between the walls, means for supplying fluid under pressure to the container to urge the walls toward each other to engage the clutch surfaces, and means for selectively venting the chamber and filling it with fluid under pressure to permit or prevent engagement of the clutch surfaces.

13. A transmission comprising in combination, a hydrodynamic torque transmitting device including a closed container for liquid, the container being rotatable about an axis and having a wall formed as a surface of revolution, impeller and turbine members in the container which members are rotatable with respect to each other and to the container, the impeller being axially movable toward and away from said wall and having a wall formed as a surface of revolution conforming to the wall of the container, said surfaces of revolution including cylindrical surfaces on the impeller wall in sealing contact with cylindrical surfaces on the container wall to define an expansible pressure chamber separate from the container, said surfaces of revolution including discontinuous, frusto-conical clutch surfaces on the container wall and on the impeller wall adapted to be engaged to establish driving connection between the walls, means for supplying fluid under pressure to the container to urge the walls toward each other to engage the clutch surfaces, and means for selectively venting the chamber and filling it with fluid under pressure to permit or prevent engagement of the clutch surfaces.

References Cited in the file of this patent

UNITED STATES PATENTS

| | | |
|---|---|---|
| 2,627,189 | McFarland | Feb. 3, 1953 |
| 2,640,572 | O'Brien | June 2, 1953 |
| 2,731,119 | Burdett et al. | Jan. 17, 1956 |

FOREIGN PATENTS

| | | |
|---|---|---|
| 668,839 | France | July 22, 1929 |
| 733,811 | France | July 18, 1932 |